United States Patent
Thompson

(10) Patent No.: US 10,619,708 B2
(45) Date of Patent: Apr. 14, 2020

(54) GEARBOX IMPROVEMENTS

(71) Applicant: QINETIQ LIMITED, Farnborough (GB)

(72) Inventor: Robert William Thompson, Camberley (GB)

(73) Assignee: QINETIQ LIMITED, Hampshire (GB)

(*) Notice: Subject to any disclaimer, the term of this patent is extended or adjusted under 35 U.S.C. 154(b) by 410 days.

(21) Appl. No.: 15/515,427

(22) PCT Filed: Sep. 29, 2015

(86) PCT No.: PCT/EP2015/072379
§ 371 (c)(1),
(2) Date: Mar. 29, 2017

(87) PCT Pub. No.: WO2016/055304
PCT Pub. Date: Apr. 14, 2016

(65) Prior Publication Data
US 2017/0234408 A1 Aug. 17, 2017

(30) Foreign Application Priority Data

Oct. 10, 2014 (GB) .................................. 1417965.9

(51) Int. Cl.
*F16H 3/10* (2006.01)
*F16D 41/12* (2006.01)
(Continued)

(52) U.S. Cl.
CPC ............. *F16H 3/10* (2013.01); *F16D 41/125* (2013.01); *F16H 3/0915* (2013.01); *F16H 63/30* (2013.01);
(Continued)

(58) Field of Classification Search
CPC ... F16H 3/10; F16H 2063/3093; F16D 41/125
(Continued)

(56) References Cited

U.S. PATENT DOCUMENTS 3,200,919 A * 8/1965 Lanigan .................. F16D 41/22
192/48.91
3,743,067 A * 7/1973 Bokovoy ................ F16D 41/22
192/43
(Continued)

FOREIGN PATENT DOCUMENTS

DE    41 28 832 A1    3/1993
DE    102 52 152 A1   5/2004
(Continued)

OTHER PUBLICATIONS

International Search Report and Written Opinion of the International Searching Authority dated Dec. 11, 2015 in International Application No. PCT/EP2015/072379.
(Continued)

*Primary Examiner* — Ha Dinh Ho
(74) *Attorney, Agent, or Firm* — Kenealy Vaidya LLP

(57) ABSTRACT

Some embodiments are directed to a gearbox including first and second rotational members, the first rotational member having a shaft portion extending away from the gearbox, the first rotational member carrying one or more projections, the second rotational member carrying one or more complementary projections, the projections carried by the first rotational member being configured to be drivingly engaged with the complementary projections carried by the second rotational member to transmit torque in a first torque connection but not in a torque connection that is opposed to the first torque connection. The gearbox further includes a one way clutch adapted such that the first and second rotational members can be drivingly engaged to transmit torque in a second torque connection, wherein the second torque connection is opposed to the first torque connection.

14 Claims, 15 Drawing Sheets

(51) Int. Cl.
*F16H 63/30* (2006.01)
*F16H 3/091* (2006.01)

(52) U.S. Cl.
CPC ............... *F16H 2063/3093* (2013.01); *F16H 2200/0052* (2013.01)

(58) Field of Classification Search
USPC ........................................ 74/337, 337.5, 339
See application file for complete search history.

(56) References Cited

U.S. PATENT DOCUMENTS

| | | | | |
|---|---|---|---|---|
| 3,780,840 A | * | 12/1973 | Thomas | ................... F16D 11/10 192/48.91 |
| 4,019,586 A | * | 4/1977 | Hauser | .................... F16D 11/10 192/48.91 |
| 4,096,932 A | | 6/1978 | Liberty, Jr. | |
| 7,766,779 B2 | * | 8/2010 | Belmont | ................. B60L 50/16 475/5 |

FOREIGN PATENT DOCUMENTS

| | | |
|---|---|---|
| GB | 255 150 A | 7/1926 |
| GB | 394 907 A | 7/1933 |
| WO | 2014/049317 A1 | 4/2014 |

OTHER PUBLICATIONS

Apr. 7, 2015 Search Report issued in corresponding British application No. GB 141 7965.9.

\* cited by examiner

GEARBOX IMPROVEMENTS

CROSS REFERENCE TO RELATED APPLICATION(S)

This application is a National Phase filing under 35 C.F.R. § 371 of and claims priority to PCT Patent Application No.: PCT/EP2015/072379, filed on Sep. 29, 2015, which claims the priority benefit under 35 U.S.C. § 119 of British Application No.: 1417965.9, filed on Oct. 10, 2014, the contents of which are hereby incorporated in their entireties by reference.

BACKGROUND

The present invention relates to an improved gearbox and, in particular, to an improved version of the Q-Shift gearbox.

Various configurations of gearbox are known, one example being the "inline" configuration. In this configuration, power flows from an input shaft to a co-axial output shaft via a laterally offset lay gear. Some versions of the inline configuration are designed such that the input shaft can be rotationally connected to the output shaft, and so obtain a 1:1 speed ratio between the input shaft and the output shaft. Avoiding the need for power to flow through the lay gear to provide this ratio has efficiency benefits.

WO2014/049317A1 discloses a Q-Shift type clutchless gearbox. The contents of this document are incorporated herein by reference. The need for a clutch for shifting is removed in the Q-Shift type gearbox by having a plurality of gearwheels of a particular design, with a dog hub of a particular design on either side of each gearwheel. The Q-Shift type clutchless gearbox is generally not designed in an inline configuration. It is desired to provide an inline version of a Q-Shift type clutchless gearbox, preferably having an improved efficiency over known versions.

SUMMARY

According to a first aspect of the invention, there is provided a gearbox comprising first and second rotational members, the first rotational member having a shaft portion extending away from the gearbox, the first rotational member carrying one or more projections, the second rotational member carrying one or more complementary projections, the projections carried by the first rotational member being configured to be drivingly engaged with the complementary projections carried by the second rotational member to transmit torque in a first torque connection but not in a torque connection that is opposed to the first torque connection, wherein the gearbox further comprises a one way clutch adapted such that the first and second rotational members can be drivingly engaged to transmit torque in a second torque connection, wherein the second torque connection is opposed to the first torque connection.

This is beneficial because, for example it enables the construction of a clutchless gearbox in which the input shaft can be directly connected to the output shaft. This gives a 1:1 gear ratio in the top gear, in which power does not flow through a gear mesh, and so is very efficient. Although embodiments of the present invention comprise a one way clutch providing a second torque connection, the one way clutch does not interfere with the lower gears. This is because, when any of the lower gears, or reverse gear are engaged, the second rotational member, which may be an output shaft, is rotating more slowly than the first rotational member, which may be an input shaft. The one way clutch therefore does not engage.

The first rotational member may be mounted for axial rotation in an aperture in a wall of the gearbox casing, for example, on bearings. The first rotational member may extend co-axially with the second rotational member. The first rotational member may comprise an input gear for transmitting torque to the second rotational member, which may be done via a lay gear when the first and second rotational members are not in contact with each other. The lay gear may be laterally offset from the first rotational member. The lay gear may comprise a plurality of gears of different diameters. Each of the plurality of gears on the lay gear may be in mesh with corresponding gears on the second rotational member. The input gear of the first rotational member may comprise circumferentially disposed gear teeth, which may be inclined to the axis of the first rotational member. The projections carried by the first rotational member may be located on a face on the input gear. The face may lie in the axial plane of the first rotational member.

The shaft portion of the first rotational member may comprise an input shaft. The second rotational member may comprise an output shaft. The input and/or output shafts may have a spline or other feature for facilitating gripping of the input/output shaft. In the first torque connection, torque is transmitted from the input shaft to the output shaft. In the second torque connection, torque is transmitted from the output shaft to the input shaft.

The engagement of the projections and complementary projections in the first torque connection may be able to transfer torque in a single rotational sense only. The complimentary projections carried by the second rotational member may be axially displaceable relative to the projections carried by the first rotational member, into engagement therewith. The complementary projections carried by the second rotational member may be provided on a generally annular support. The support may have a support surface lying generally in the axial plane of the second rotational member, upon which the complementary projections are located. The support may comprise an aperture through which the second rotational member extends. The support and the second rotational member may, in the region of the aperture, comprise corresponding mating features to permit relative axial movement therebetween and/or prevent relative radial movement therebetween. The corresponding mating features may comprise axially extending splines. In use, the support may be displaced axially, such that the mating splines of the support slide along the corresponding mating splines of the second rotational member, until the complementary projections lie in the same axial plane as the projections carried by the first rotational member and so engagement can take place.

The angular positions of the first and second abutment surfaces and the projections and complementary projections may be selected such that there is a very small amount of backlash when the torque reverses.

The projections and complementary projections may be arranged such that, when drivingly engaged, the projections and complementary projections are positively engaged. This 'positive engagement' may comprise an 'overhang' portion on at least one projection or complementary projection, such that, when drivingly engaged, the projections and complementary projections are urged together.

If the first rotational member is rotating faster than the second rotational member, the projections and complementary projections may be urged apart. This could be achieved by having ramp-like projections and complementary projections which have mating faces when in driving engagement but where opposite relative rotation exists, the slopes of the ramps allow the projections and complementary projections to ride over one another, in the manner of a ratchet.

The projections and/or the complementary projections may comprise a ramped form having a base in contact with the annular body, a sloping surface and a mating surface, and arranged such that the sloping surface on the projection inclines in the opposite direction to the sloping surface on the complementary projections. The mating surface may be formed such that it extends at least partially beyond the base so as to create an overhang. For example, therefore, the projection may have the form of a sawtooth, or an obtuse scalene triangle. The arrangement is preferably similar to a ratchet tooth-arranged for positive engagement in one sense only.

The sloped ramp allows the projections and complementary projections to ride over one another where there is relative rotation and, where provided, the 'overhang' prevents unintended separation during driving engagement, and indeed urges close engagement during driving engagement, in a manner similar to a ratchet arrangement.

The one way clutch may comprise a first abutment for transmitting torque from the first rotational member to the second rotational member. The first abutment may have a first abutment surface. The one way clutch may further comprise a second abutment for the transfer of torque from the second rotational member to the first rotational member. The second abutment may have a second abutment surface. Torque may be transferred by the abutment of the first abutment surface by the second abutment surface.

The first abutment surface may extend generally radially inwardly. The first abutment surface may be integral with the first rotational member. The first abutment surface may be provided on an interior surface of a clutch recess in the first rotational member. The clutch recess may extend axially. There may be a plurality of first abutment surfaces, for instance there may be three first abutment surfaces. In embodiments where there is a plurality of first abutment surfaces, the first abutment surfaces may be spaced at equal angular intervals around the interior surface of the recess.

The second abutment surface may extend generally radially. The second abutment surface may be located within the clutch recess and may be located at the axial mid-point of the recess. The second abutment surface may be radially displaceable. The second abutment surface may be displaceable in the radially outward direction under the influence of the centrifugal force generated by the rotation of the second rotational member. Alternatively, a bias such as a spring could be used to displace the second abutment surface. The second abutment surface may be carried by a second abutment element. The second abutment element may be formed in metal and may have a generally oblong shape. The path along which the second abutment surface is displaceable may be partly defined by a bore in the second rotational member. The bore may extend radially. The bore may be a through bore. The bore may be dimensioned to permit radial displacement of the second abutment element therewithin. Alignment of the second abutment element may be constrained by aligning means, eg a pin extending through an elongate aperture in the second abutment element. The aligning means is adapted to ensure that, during abutment, the first abutment surface is substantially parallel to the second abutment surface. Alternatively, the cross-sectional shape of the alignment means and/or the bore may be chosen to substantially prevent rotation of the second abutment element in the bore.

The one way clutch may have a first deflection surface in fixed relation to the first rotational member. The one way clutch may have a second deflection surface in fixed relation second rotational member. When the second rotational member rotates more slowly than the first rotational member the second deflection surface may deflect from the first deflection surface such that no significant quantity of torque is transferred from the first deflection surface to the second deflection surface.

The first deflection surface may be a generally smooth surface and may extend in the axial plane and may be provided on the inwardly facing surface of the clutch recess. The first deflection surface may have a ramped form such that it has a raised end and a non-raised end, the raised end being located a smaller radial distance from a main axis of the first rotational member. The first abutment surface may be located in the vicinity of the raised end of the first deflection surface.

The second deflection surface may be in fixed relation to the second abutment surface. The second deflection surface may be curved in the axial plane. When the first rotational member is rotating faster than the second rotational member, the second rotational member may contact the first deflection surface. The ramped form of the first deflection surface may cause the first deflection surface to apply a radial deflecting force to the second deflection surface, causing the second abutment surface to be deflected away from the first abutment surface. This deflection may cause the first deflection surface to travel radially inwardly. The first deflection surface may travel along or towards the radial bore. The second deflection surface may be provided on the second abutment element. The second deflection surface may comprise a chamfered corner of the second abutment element.

The second rotational member may comprise an output shaft. At least one drive member is provided on the output shaft which is in mesh with a corresponding gear on the lay shaft. Two selector members may be associated with the at least one drive member. The drive member may comprise a first and second face, and may further comprise, on each face, at least one projection, and the selector members may comprise, on at least one face thereof, at least one complementary projection arranged to selectively engage with a projection of a drive member, the arrangement being such that the projection(s) of a selector member and the projection(s) of the first face of a drive member may be drivingly engaged so as to transfer torque in a first rotational sense and the projection(s) of a selector member and the projection(s) of the second face of a drive member may be drivingly engaged so as to transfer torque in a second rotational sense, opposite to the first rotational sense.

The selector members as described herein can therefore act as one-way driving clutches which selectively engage at least one drive member (the term 'selectively' in this context meaning that they can also be disengaged from the drive member). In preferred embodiments, there will be at least two drive members and at least three selector members. In such cases, an advantage of using such a selector member on each side of the drive member is that the components can be simple and robust in comparison with eg, a dog clutch and synchromesh arrangement. As will be appreciated by the skilled person, the selector members may rotate at high speed. Therefore, they are preferably simple one piece components, ideally without any spring components, internal sliding components or the like, which are affected by forces caused by centripetal acceleration. They can also be relatively narrow. There are advantages over a simple dog clutch (which may be familiar to the person skilled in the art): The use of two engagement members, one for forward drive and one for reverse drive, allows for large backlash while engaging but low backlash when fully engaged, so providing for more reliable, faster engagement and allowing for a bigger speed difference at engagement.

Further, by providing separate selector members, each of which is arranged to drivingly engage with the drive member in one sense of relative torque, only one of the selector members is drivingly engaged with the drive member in any given torque state. This allows the other to be selectively disengaged, which in turn means that another drive member can be selectively engaged and can 'pick up' driving without any interruption torque transmission The drive member selection mechanism may be arranged such that, when drivingly engaged, the complementary projections are positively engaged. This 'positive engagement' could comprise a physically interference preventing disengagement, for example, an 'overhang' portion on at least one projection, such that, when in driving engagement, a selector member may not move away from a drive member. Indeed, in preferred embodiments, the arrangement may be such that, when drivingly engaged, the complementary projections are shaped so as to draw or urge a drivingly engaged selector member and driving member together. This ensures that the driving engagement may only be selectively or deliberately discontinued.

In some examples, the projections and/or selection mechanism is/are arranged such that, where relative rotation between a selector member and a drive member is in the opposite direction to the direction of torque for which driving engagement exists, the drive member and selector member are urged apart. This will prevent inadvertent engagement of the 'one-way driving clutch' selector member in the opposite direction to that which was intended. This could be achieved by having ramp-like projections which have mating faces when in driving engagement but where opposite relative rotation exists, the slopes of the ramps allow the drive member and selection members to ride over one another, in the manner of a ratchet. However, as would be familiar to the skilled person, this need not be the case—for example, the selector member and the drive member could be physically moved apart using some selection mechanism (although this may result in increased complexity when compared to the 'ratchet' arrangement described above). The term 'mating' as used herein refers to any face or component arranged to contact another face/component and does not imply any interlock, shaping or the like.

In some examples, the projections on the drive members are arranged to limit the backlash when changing from a positive torque condition to a negative torque condition. This may mean that the mating, or driving, face of a projection on the first side of the drive member is closely aligned, or aligned at least to within specified tolerances, with the driving face on the second side. Of course, the selector member would also have to be correctly mounted to achieve this and one way of ensuring that the selector members are correctly mounted would be to have a mounting arrangement in which a spline is missing from the selector members and from the shaft on which they are mounted. The drive member selection mechanism may be arranged such that the selector member which is not drivingly engaged in a given torque condition may be selectively moved away from a drive member. This allows the selector member to be positioned to engage a different drive member, which may be desirable in some embodiments and further means that, in order to deselect a drive member from driving engagement, only one selector member will have to be moved.

In some examples, the drive members and the selector members are arranged on a common axis and are arranged such that their relative axial positions may be changed. Selector member(s) may be slidably mounted on the axis.

The position of at least one axis-mounted selector member may be determined by at least two preloaded springs. The springs are preferably preloaded against fixed stops, therefore positive control of the movement of the selectors is provided, but with the maximum force in the mechanism limited to substantially the pre-load on the springs.

In one embodiment, at least one selector member may be arranged between two drive members and comprise at least one projection on each face thereof, wherein the projection(s) on a first face may be brought into engagement with the projection(s) on one drive member and the projection(s) on a second face may be brought into engagement with the projection(s) on another drive member. Providing such a 'two faced' selector member simplifies the components required in a multi drive member embodiment. The generally annular support upon which the complementary projections may be provided may comprise such a 'two faced' selector member. The complementary projections may be provided on one face of the selector member. The opposite face of the selector member may be provided with projections for engaging with the projections of the drive member corresponding to the second highest gear ratio.

In some examples, three projections may be provided on each face of a drive member and a selector member. While there could be any number of projections, from one per face to many, it will be appreciated that more than one is desirable to spread load, but if the number of projections becomes high, manufacturing becomes more complex and, because they will have to be thinner and smaller, the projections may become weaker. The number of desirable projections may vary according to the application of the drive member selection mechanism.

The mechanism may comprise a shift mechanism arranged to control the position of at least one selector member, comprising a rotating drum portion having circumferential tracks cut therein, where the selector member(s) are mounted such that rotation of the drum member determines the position (for example the axial position) of the selector member.

The drive member selection drum may be arranged to control the position of at least two selector members, and the drive member selection mechanism may further comprise a gate arranged to prevent the selection of more than one drive member in driving engagement at any given time. This prevents 'clashing' selections of gears. In particular, where the drive members provide different gear ratios and each can be in a condition of positive torque where the drive member is acting to drive associated components, or negative torque where the associated component is driving the drive member, the shift mechanism is preferably arranged to prevent the simultaneous engagement by a negative driving selector member of one gear and a positive driving selector member of a higher gear, or the simultaneous selection of a positive driving selector member of one gear and a negative driving selector member of a lower gear.

The selector members may be mounted in association with tracks, or cut-outs, formed in the drums. Preferably, the tracks have curve(s) formed therein such the path formed by the track varies axially and the tracks are 'symmetrical' on both sides of the drum, and the shift mechanism comprises at least two shift arms in association with each drum, each arranged in association with one side of a drum, and to engage with the track formed thereon. This allows the selector member to flex slightly and accommodate slight misalignments. The nature of the 'symmetry' is such that the form or pattern (e.g. of curve(s) in the track is repeated at 180 degrees displacement around the drum. The symmetrical track allows the shift mechanism to act substantially axially on the selector members (as both shift arms will experience the same axial displacement under the action of the track).

In embodiments with a plurality of drums, the drums may be substantially identical, and may be mounted with a relative rotational displacement. Using identical parts is desirable because it reduces manufacturing complexity.

The drum(s) may be mounted on a shift shaft, wherein each drum is urged towards a rest position by at least two resilient members acting along the axis of the shift shaft. The resilient members ensure that the position of the selector member is held securely but allow movement in the case of forces above a threshold. In one example, the resilient members are springs mounted inside the shift shaft although other arrangements will occur to the skilled person.

The selector member may comprise a substantially annular body having a first face and a second face, wherein at least one projection is arranged on each face, the projection comprising a ramped form having a base in contact with the annular body, a sloping surface and a mating surface, and arranged such that the sloping surface on the first face inclines in the opposite direction to the sloping surface on the second face. The mating surface (it will be recalled that the term 'mating; implies only that the face may be brought into contact with another face) may be formed such that it extends at least partially beyond the base so as to create an overhang. For example, therefore, the projection may have the form of a sawtooth, or an obtuse scalene triangle. The arrangement is preferably similar to a ratchet tooth-arranged for positive engagement in one sense only. Therefore, to express the invention in an alternative way, a drive member is provided which comprises a substantially annular body having a first face and a second face, wherein at least one projection is arranged on each face, the projection comprising a ramped form having a base in contact with the annular body, a sloping surface and a mating surface, and arranged such that the mating surface(s) on the first face lead the projection(s) in a first sense of rotation, and that the mating surface(s) on the second face lead the projection(s) in a second, opposite sense of rotation.

The sloped ramp allows a drive member and selector member to ride over one another where there is relative rotation and, where provided, the 'overhang' prevents unintended separation during driving engagement, and indeed urges close engagement during driving engagement, in a manner similar to a ratchet arrangement.

The selector member may additionally comprise means for engaging with a shaft, for example a drive shaft. Such means may comprise teeth arranged about the interior ring of the annulus, arranged to engage with complementary teeth on a shaft, or other engagement means.

The gearbox may further comprise a simple gear selection mechanism using spring loaded selector drums and a simple means to block inappropriate gear selections. The simplicity of a gearbox according to the present invention therefore provides a low cost light weight, high efficiency, rapid shifting transmission for use in any vehicle type. The spring mechanisms required to control shifting are preferably preloaded to give positive control of the movement of the components (avoiding the poor control seen in prior art systems which used non preloaded leaf springs for the same purpose).

BRIEF DESCRIPTION OF THE FIGURES

A preferred embodiment of the invention will now be described, for illustration only, with reference to the accompanying drawings, in which.

DETAILED DESCRIPTION OF EXEMPLARY EMBODIMENTS

Embodiments of the present invention concern an improvement to a known type of clutchless gearbox. The known type will be referred to here as the Q-shift gearbox. For clarity, a known version of the Q-shift gearbox will now be described. An improved version thereof which is in accordance with an embodiment of the present invention will then also be described.

Figure 1:
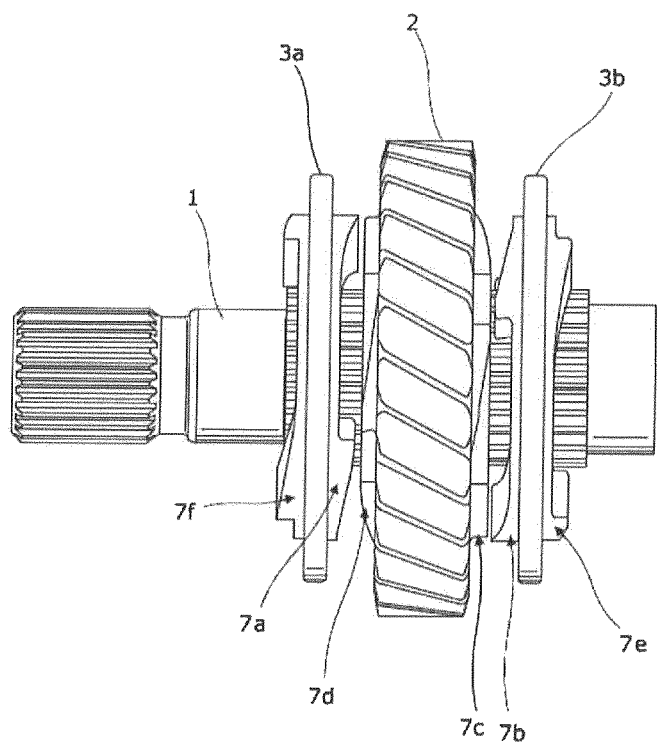
FIG. 1 shows the assembly of the main components of an embodiment of the known Q-shift gearbox in a fully disengaged state.

FIG. 1 shows the assembly of the main components of the Q-shift gearbox in a fully disengaged state. The shaft 1 passes through a first selector member, herein referred to as a 'dog hub' 3a, a drive member in the form of a gear 2 and a second dog hub 3b. The gear 2 is mounted on the shaft by a low friction bearing (not visible), being, in this embodiment, a combination of plain thrust washers and a needle roller bearing, so that it is axially and radially located on the shaft 1 but free to rotate relative to the shaft 1.

In this embodiment the drive member is a gear 2, although in other embodiments the drive member may be any part of a drive mechanism which is required to be selectively rotatively engaged to a shaft, for example a roller chain sprocket or a belt drive pulley.

Figure 2:
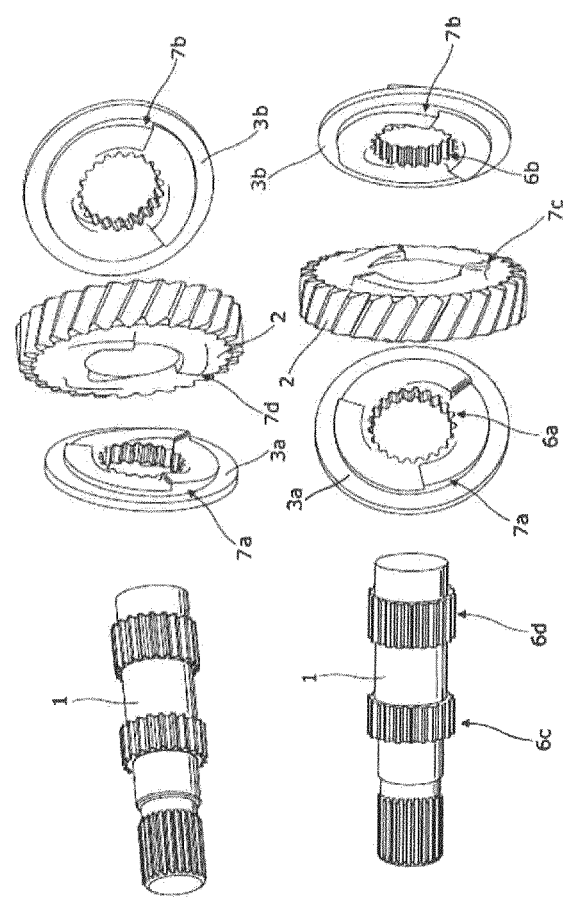
FIG. 2 is an exploded view of the main components of the embodiment of FIG. 1.
Figure 3:
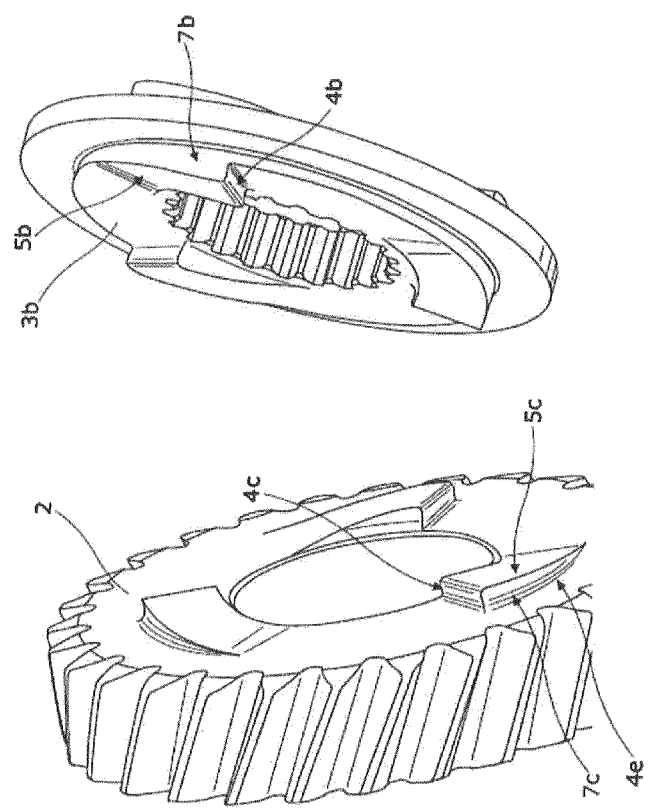
FIG. 3 shows a detail view of the dog features on a dog hub 3b and the corresponding dog features on the gear 2 of FIG. 1.

As can be seen with reference to FIGS. 1 to 3 in particular, dog hubs 3 are substantially annular having two faces and a means for engaging with the shaft 1, in this example, a toothed inner ring 6a, 6b. They also comprise a plurality (in this example, 3) of projections or engagement 'dog' features 7a, 7b, 7f, 7e, arranged on each face thereof. The gear 2 is also annular, comprising a toothed outer surface and two opposed faces. The gear further comprises a plurality (in this example 3 on each face) of engagement 'dog' features 7c, 7d. The dog features 7 of the hubs 3b are shaped to engage the dog features 7 of the gear 2, as will be described in greater detail below.

In the disengaged state of FIG. 1, the two dog hubs 3a and 3b are axially displaced away from the gear 2 so that the dog features 7a, 7b on the hubs are disengaged from the corresponding dog features 7c, 7d on the gear 2. It will be noted that the dog features 7e, and 7f on the second face (as illustrated, the outer faces) of two dog hubs 3a, 3b do not engage with the gear 2 shown in FIGS. 1-5, but are provided to allow for engagement with other gears which may be mounted on the main shaft (see FIG. 6 onwards).

FIG. 2 is "an exploded view" of the main components of FIG. 1, in which the lower half of FIG. 2 shows the same components as the upper half of FIG. 2 but at a different viewing angle to reveal the dog features 7 on the second side of the gear 2. In the upper half of FIG. 2 the dog features 7a on the dog hub 3a and the corresponding dog features 7d on one side of the gear 2 are visible. In the lower half of FIG. 2 the dog features 7b on the dog hub 3b and the corresponding dog features 7c on the other side of the gear 2 are visible.

In this embodiment as illustrated in the accompanying illustrations, each face of each dog hub 3 and each face of each gear 2 have three such projections provided by the dog features 7 substantially evenly distributed around the axis of the shaft. However, the use of any number of similar dog features 7 per face is possible. For example if higher load capacity was required more dog features 7 could be used, or for simplicity, or to achieve engagement with higher speed difference, fewer dog features 7 could be used. However, providing three dog features 7 per face provides for substantially even load sharing between dog features 7 and gives a self centering action when the dog features 7 are transmitting torque. If greater than three dog features 7 are used, high accuracy of manufacture is required to ensure that any errors in dog feature position are less than the deflection of the dog features 7 under load if load sharing over more than three dog features 7 is to be achieved. Also the use of three dog features 7 per face provides a large angular gap between features to allow positive engagement with a high relative speed between a dog hub 3 and gear 2.

The shaft 1 comprises a plurality of male spline teeth portions 6c, 6d (the number of which corresponds to the number of dog hubs 3 in the assembly), and the inner ring of the dog hubs 3 carry corresponding female spline teeth 6a, 6b. These mating splines 6c, 6d and 6a, 6b are toleranced to engage with a clearance fit. The male spline teeth are wider (i.e. extend further axially along the shaft 1) than the female spline teeth such that, once arranged on the shaft 1, the dog hubs 3a, 3b are radially and rotatively connected to the shaft 1 when aligned with the male spline teeth 6c, 6d but are free to move axially, while maintaining this connection to the shaft 1. This allows the dog features 7a, 7b of the dog hubs 3a, 3b to move in and out of engagement with the dog features 7c, 7d of the gear 2 while still being driven by the shaft 1.

FIG. 3 shows a detail view of the dog features 7b on a dog hub 3b and the corresponding dog features 7c on the gear 2. Each of the dog features 7a-d consist of a ramp-like block projecting above the side face of the gear 2 or dog hub 3. Each dog feature 7a-d rises from a base 4e which is in the same plane as the face of the dog hub 3 and comprises a sloping surface 5b, 5c and a 'mating' or contacting surface 4c, 4b which is angled away from the axis of the shaft 1 to provide positive engagement, or a physical interlock, between a feature on a hub 3 and a feature on the gear 2 when one is rotatively driving the other.

Furthermore, taking the example of a single hub, when the dog hub 3b is moved towards the gear 2 by action of a shifting mechanism (described herein below), the leading edges 4b of the dog features 7b of the dog hub 3b will become engaged with the leading edges 4c of the dog features 7c of the gear 2 and provide a means of transmitting torque between the two components. The contact forces between the mating faces 4b, 4c, resulting from the transmission of torque will tend (because of the angle of the faces 4b, 4c) to pull the dog hub 3b toward the gear 2, so ensuring there is no tendency for the mechanism to fall out of engagement when transmitting torque.

The sloping surfaces 5b, 5c of the dog features 7b, 7c provide a trailing edge which ramps at a relatively shallow angle. When there is relative rotation between the dog hub 3b and the gear 2 in the other sense, the shallow sloping surface 5b, 5c will easily ride up each other so forcing the dog hub 3b away from the gear 2 and so disengaging any connection between the two components. This 'ramped' form of the dog features 7a-f therefore provides for positive engagement and transmission of torque in one sense of relative rotation and for disengagement of the dog features 7a-f and no transmission of torque in the other sense of relative rotation.

It should be noted that the dog features 7 on one side of the gear 2 and the corresponding dog features 7 on the dog hub 3a, as visible in the upper half of FIG. 2, are adapted to give positive engagement and driving connection between the dog hub 3a and the gear 2 in one sense of relative rotation and the dog features 7 on the other side of the gear 2 and the corresponding dog features 7 on the dog hub 3b are adapted to give positive engagement and driving connection in the other sense of relative rotation. Therefore when both dog hubs 3 are moved toward the gear 2 by action of a shifting mechanism (described later), there exists positive driving engagement in both senses of relative rotation between the gear 2 and the dog hubs 3a, 3b, and since both the dog hubs 3a, 3b are connected to the shaft by splines, to the shaft 1.

Figure 4:
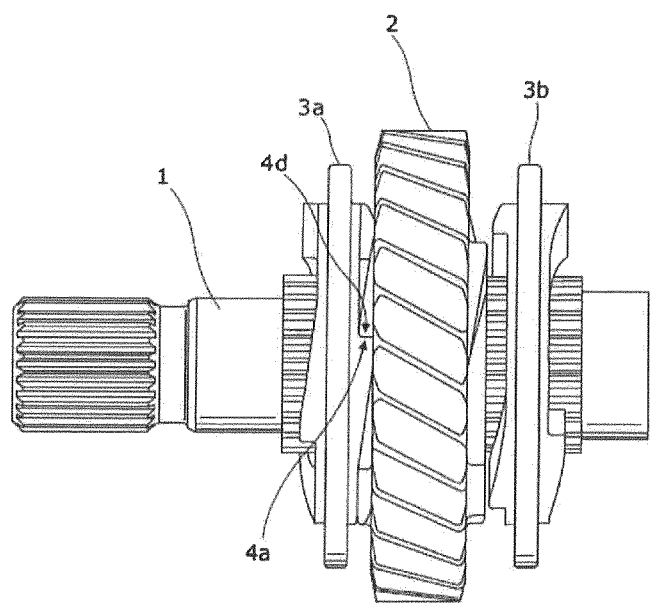
FIG. 4 shows the assembly of the main components of the embodiment of FIG. 1 in a semi engaged state.

FIG. 4 shows the assembly of FIG. 1 in a 'semi engaged' state. Dog hub 3a is in contact with gear 2 and the mating surfaces 4a, 4d of the dog features 7 are in contact with each other. Dog hub 3b is axially displaced away from the gear 2 so that there is a clearance between the tips of the dog feature projections. In this state therefore the gear 2 is rotatively connected to the shaft 1 for relative rotation (e.g. positive torque/forward drive) in one sense but not in the other sense (e.g. negative torque/reverse drive).

Figure 5:
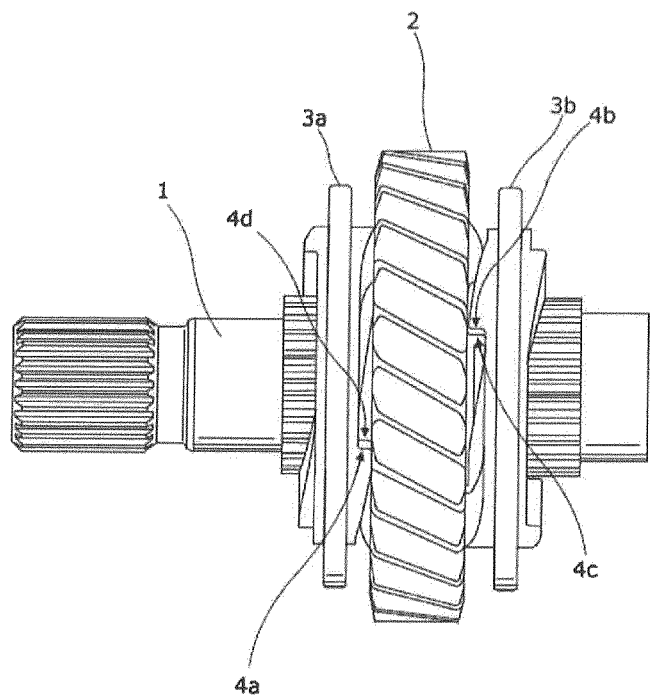
FIG. 5 shows the assembly of the main components of the embodiment of FIG. 1 in a fully engaged state.

FIG. 5 shows the assembly of FIG. 1 in a fully engaged state. Both dog hubs 3a, 3b are in contact with the gear 2. The leading edges of the dog features 7a, 7b on the dog hubs 3 are in engagement with the corresponding leading edges of dog features 7c, 7d on the gear 2. In this state therefore the gear 2 is rotatively connected to the shaft 1 for relative rotation and drive in both senses. It should be noted that the assembly of the dog hubs 3a, 3b onto the shaft 1 is chosen so that in this state of full engagement only a small tangential clearance exists between the leading edges of the dog features 7. This small tangential clearance ensures that only a small amount of backlash is present between the gear 2 and the shaft 1 in this fully engaged state. For road vehicles, especially passenger vehicles, low backlash is desirable for passenger comfort, to minimise torsional shocks in the driveline each time a torque reversal occurs, for example when the driver lifts off the accelerator pedal. A minimal amount of clearance is provided between the dogs to allow for engagement of the dog features 7a-f having angled leading edges (as shown in this embodiment) to provide positive engagement, and to allow for manufacturing tolerances.

Figure 6:
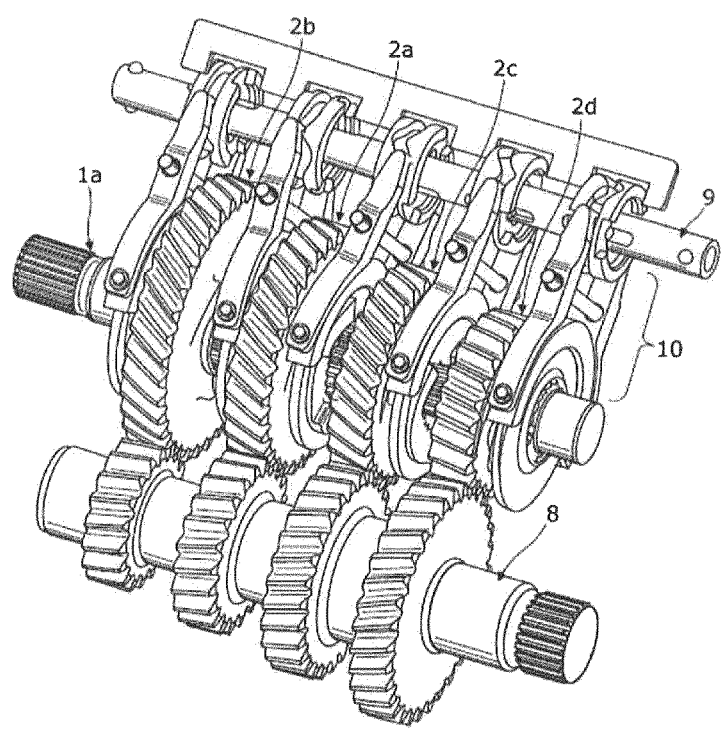
FIG. 6 is an overall view of a version of the known 4-ratio Q-shift gearbox including a shifting mechanism.

FIG. 6 is an overall view of a 4-ratio, Q-shift type clutchless gearbox. The main shaft 1a carries four gears 2a, 2b, 2c, 2d, of varying diameters each meshing with a lay gear 8, the lay gear 8 having four meshing gears 2 formed along its length. The main shaft 1a is the input and the lay gear 8 is the output. When one of the gears 2a-d is selected, by rotatively connecting it to the main shaft using the dog hubs 3, there is a driving connection between the input shaft 1a and the lay gear 8, the relative speeds of the input shaft 1a to the lay gear 8 being the ratio of the numbers of teeth on the selected gear 2 and the meshing gear on the lay gear 8. The diameters and tooth numbers on each of the gears are chosen to achieve substantially similar ratio differences between adjacent gear pairs so providing for similar step changes in input speed as shifts are made.

The shift mechanism comprises a shift shaft 9, connected to a number of shift mechanisms 10. In this four speed example embodiment there are five such shift mechanisms, one for each dog hub 3. The dog hubs 3 between each of the gears 2 on the main shaft 1a have dog features 7 formed on both sides, as shown in FIG. 1, to engage with either of the adjacent gears 2. The dog hubs 3 on each end of the main shaft 1a shown in this illustration have dog features 7 on only one side to engage with the adjacent gear 2. However, for convenience, to minimise the number of different components used in a given gearbox, and to guard against incorrect assembly, the same 'two sided' dog hub 3 as used between gears 2 could be used at the end of the main shaft 1a, with its outer dog feature 7 being redundant.

The main shaft 1a, the lay gear 8 and the shift shaft 9 are supported in a casing on suitable bearings, one bearing at each end of each shaft. The casing and bearings are not shown in this illustration but suitable bearings would be familiar to the person skilled in the art.

Figure 7:
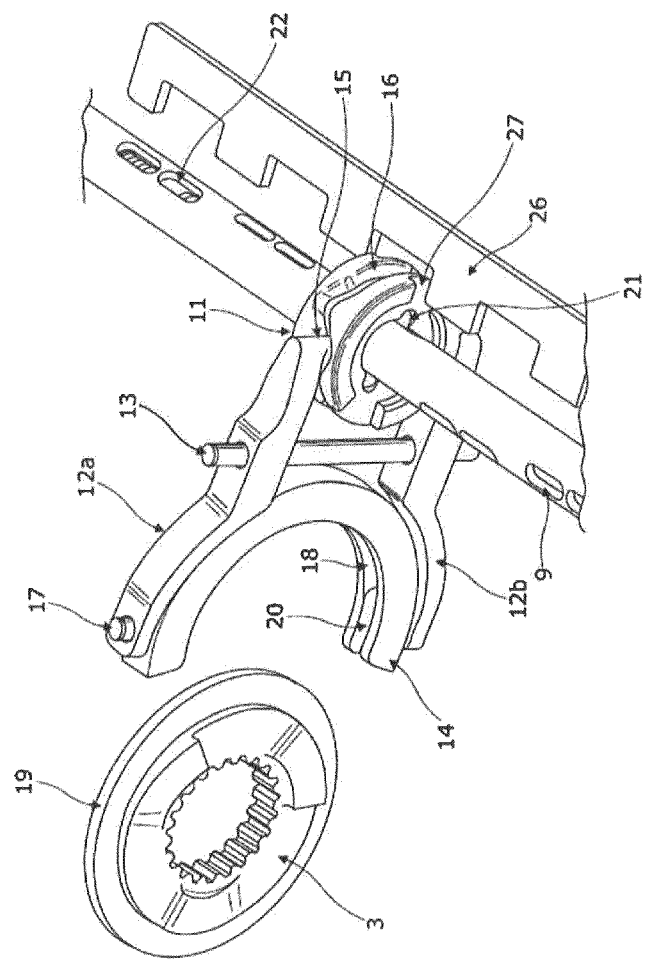
FIG. 7 shows the components of the shifting mechanism of FIG. 6 with one dog hub shown in an exploded view for reference.

FIG. 7 shows the components of the shifting mechanism coupled to one dog hub 3 shown in an exploded view. A selector drum 11 is mounted on the shift shaft 9. Shift arms 12a, 12b are provided, one mounted above and one mounted below each selector drum 11, and located into the gearbox case (not illustrated) by a pivot pin 13. The pivot pin 13 is located in holes in the gearbox case so as to be stationary with the case. On one end of each pivot arm 12a, 12b there is a pin 15, which engages with a track 16 cut in the outer diameter of the selector drum 11 (see also FIG. 9 for views of the tracks 16). As can perhaps be better appreciated in the assembled shifting mechanism shown in FIG. 9, the axial position of the track 16 varies around the circumference of the drum 11. As the drum 11, is rotated with the shift shaft 9, the pin 15 therefore is moved axially and the shift arms 12a-b, pivot around the pivot pin 13. On the other end of the shift arms 12a, 12b is mounted the shift thrust ring 14. Pins 17 formed on the outside of the shift thrust ring 14 fit through holes in the ends of the shift arms 12a, 12b so that the shift thrust ring 14 can pivot on the end of the arms 12a, 12b. The shift thrust ring 14 is formed to have a groove 18 around its inside diameter which fits over a ridge 19 formed on the outside diameter of the dog hub 3. When the shift thrust ring 14 is fitted over the dog hub 3 there exists a small axial clearance between the inside of the groove 18 and the profile of the ridge 19 so that the dog hub 3 can freely rotate inside the ring 14, but if the ring 14 is axially displaced the dog hub 3 is also axially displaced. Specifically, when the shift arms 12a, 12b pivot by the action of the selector drum 11 being rotated, the shift thrust ring 14 therefore is axially displaced and with it the dog hub 3.

The gearbox is assumed to be partially filled with oil for cooling and lubrication of the gears and bearings. This oil therefore will provide lubrication between the inside of the groove 18 and the ridge 19 so forming a thrust bearing capable of displacing the dog hub 3 for the purpose of gear selection when the gearbox is rotating at high speed. As will be familiar to the skilled person, some of the inside surface of the groove 18 may be cut back to leave raised thrust pads to reduce the area of contact between the groove 18 and the ridge 19 to reduce friction and aid lubrication.

The thrust bearing between the shift thrust ring 14 and the dog hub 3 may alternatively be any other suitable form of thrust bearing, for example a needle roller thrust bearing, a ball bearing or a spherical roller bearing. As will be familiar to the skilled person, any such bearing is capable of causing an axial displacement of the dog hub 3.

Figure 8:
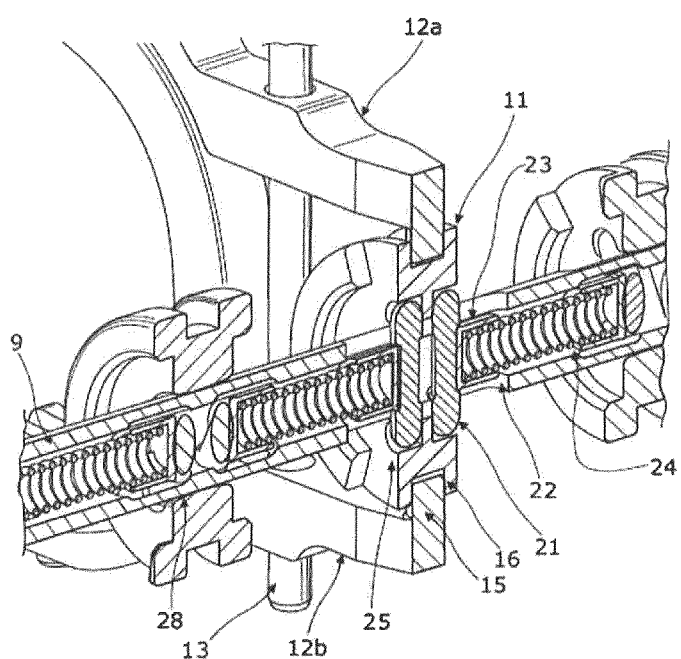
FIG. 8 is a section view through the axis of a shift shaft 9, showing a spring connection between the shift shaft and selector drum.

FIG. 8 is a section view through the axis of the shift shaft 9 revealing the spring connection between the shift shaft 9 and the selector drum 11. The shift shaft 9 comprises a tube with a series of slots 22 (see also FIG. 9) which are cut through the tube wall. Pins 21, one each side of each selector drum 11, fit through the slots 22 and engage with cut out tracks 25 on each side of the selector drum 11. Springs 24 are fitted inside the shift shaft 9 between each selector drum 11 with spring cups 23 on each end of each spring 24, the spring cups 23 resting on the pins 21. The springs 24 are selected to be longer than the gap between each spring cup 23 so that they are partially compressed on assembly and so provide a defined preload to the pins 21. The middle portion of each pin 21, on which the spring cups 23 rest, is a smaller diameter so that there is a step each side of the spring cup 23 to retain the pin 21 in position in the shift shaft 9 even if the pin 21 is revealed by axial displacement of the selector drum 11. It should be noted that the gap between the ends of the slots 22 in the shift shaft 9 and the axial thickness of the material between the cut-out tracks 25 in the selector drum 11 are substantially the same, so that preload on the pins 21 from the springs 24 holds the pins 21 in contact with the ends of the slots 22 and the selector drum 11 is positively located between the pins 21 along the axis of the shift shaft 9. The pins 21 passing through the slots 22 and into the cut-outs 25 in the selector drums 11 provide a rotary connection between the shift shaft 9 and the drums 11 but allow axial displacement within the length of the slot 22. If a force acts to push the sector drums 11 along the shift shaft 9 which exceeds the preload in the springs 24 then the pins 21 will move along the slot 22, further compressing the spring 24, allowing axial displacement of the selector drum 11 while maintaining rotary connection. The selector drums 11 therefore are positively located along the length of the shift shaft 9 so can provide positive control over the shift arms and the movement of the dog hubs 3 along the shaft 1, but if a load defined by the preload in the springs 24 is exceeded, then the selector drums 11 may be axially displaced along the shift shaft 9.

It should be noted that, in this example, each selector drum 11 is fitted over the shift shaft 9 with a clearance fit to allow axial displacement and additionally the internal bore 28 of the selector drum 11 is of a double conical form to allow for some misalignment of the drum 11 on the shaft 9. Additionally it should be noted that the two shift arms 12*a* and 12*b* in the example embodiment can pivot independently of one another. This provides for an amount of flexibility in the mechanism to allow for variation in the geometry of each component due to manufacturing tolerance and the like. The dog hub 3 is then allowed to contact the gear 2 without being overly constrained by the shift mechanism. It may also be noted that the use of a selector drum 11 with two pins 15 engaging in its track, one directly opposite the other, ensures that the resulting forces from the shift arms 12 on the selector drum 11 act substantially at the centre line of the shaft 9 on the spring 24. This configuration therefore resists any tendency for the drum 11 to bind on the shift shaft 9 if it is axially displaced by the action of the dog features 7 on the dog hub 3 engaging with dog features 7 on the gear 2.

It may be noted, that, in this example, for cost effective manufacture by minimising the number of different components used and preventing incorrect assembly, each of the selector drums 11 fitted to the shift shaft 9 are identical components, and that their angular and axial positions are determined by the location of the various slots 22 cut through the shift shaft 9. Also the selector drums 11 are designed to be symmetrical so
that they do not need to be installed in any particular orientation to function correctly. However, this need not be the case in all examples.

FIG. 7 shows a selector drum 11 fitted to the shift shaft 9. Adjacent to the drum 11 is the gate 26. The gate 26 is fixed to the case of the gearbox (not shown), and has a series of slots through which pass the edges of each selector drum 11. There exists a clearance between the drums 11 and the slots in the gates 26 so that in normal operation the drums 11 rotate freely without contacting the gate 26. In the end faces of each drum 11 there are cut-outs 27 adjacent to the slot in the gate 26. At certain angular positions the cut-out 27 of a drum 11 aligns with the gate 26 so that if the selector drum 11 is displaced axially along the shift shaft 9 then the cut-out 27 engages with the gate 26, and the rotation of the drum 11, and the whole shift shaft 9, is limited to the angular extent of the cut-out. This provides a mechanism to block certain combinations of dog hub 3 movement which could otherwise damage the gearbox as now described. In other angular positions, the cut-out 27 does not align with the gate 26 and so the axial movement of the drum 11 is limited by the gate 26.

It should be noted that the cut-outs 27 in the selector drum 11 are aligned with the gate 26 when the pin 15 on the shift arms 12 are in the portion of the track 16 which cause axial displacement of the pin and so moves the shift arms 12 and moves the dog hubs 3 into engagement with the gears 2. The remaining portion of the tracks 16 in the selector drums 11 provide no axial displacement, therefore when the pins 15 are in this portion of the track the dog hubs 3 are held substantially at mid position between gears 2 and so are not in engagement with the gear 2, and cut-outs 27 do not align with the gate 26 so axial displacement of the drum 11 is limited to the clearance between the drum edges and the gate 26.

Figure 9:
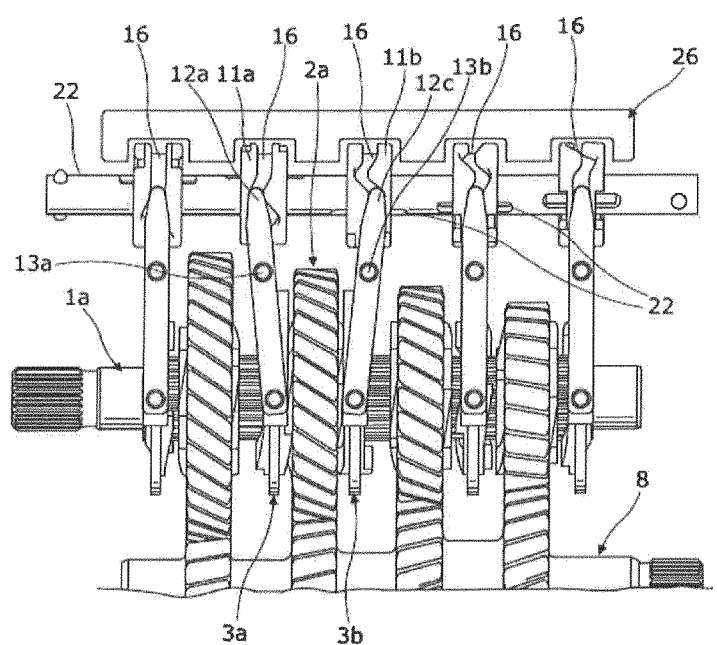
FIG. 9 is a plan view of an embodiment of a known 4-ratio Q-shift gearbox shown with one ratio fully engaged.

This shift mechanism could also be used in other drive member selection assemblies FIG. 9 is a plan view of a Q-shift type gearbox having four gear ratios, one of which is fully engaged. Specifically, dog hubs 3*a*, and 3*b* are engaged with gear 2*a*. The shift shaft 9 is in an angular position where the pins 15*a*, 15*b* in tracks 16*a* and 16*b* in the selector drums 11*a* and 11*b* are displaced axially away from gear 2*a* so that shift arms 12*a* and 12*c* are pivoted around the pivot pins 13*a*, 13*b* to hold the dog hubs 3 in engagement with the gear 2*a*.

The gearbox is assembled so that up shifts are performed with substantially positive torque transmission, (i.e. when the sense of torque at the input shaft is the same as the sense of rotation), and down shifts are performed with substantially negative torque (when the sense of torque at the input shaft is opposite to the sense of rotation). Up shifts are transitions from one gear ratio to another which result in a reduction in input shaft speed for a constant output shaft speed and are normally performed sequentially as the vehicle accelerates. Down shifts are transitions from one gear ratio to another which result in an increase in input shaft speed for a constant output shaft speed and are normally performed sequentially as the vehicle decelerates.

In FIG. 9 it should be noted that the dog features 7 on the right hand faces of each gear 2 and the meshing dog features 7 on the dog hub 3 provide positive driving torque connection between the gear 2 and the shaft and that dog features 7 on the left hand side of each gear 2 provide negative driving torque connection between the gear 2 and the shaft. When the gearbox is transmitting positive torque therefore the dog hub 3*b* on the right hand side of gear 2*a*, as illustrated in FIG. 9, is transmitting torque from the input shaft to the gear 2, the gear 2 then meshing with the lay gear drives the output. It should be noted that when transmitting torque, due to the angled faces of the dog features 7 and the friction in the spline connection between the dog hub 3 and the shaft 1, the dog hub 3 may not readily be moved away form the gear 2 to disengage the gear 2 from the shaft. The preload in the springs 24 on the shift shaft 9 is limited to ensure that disengagement can only occur at relatively low torque levels.

As shown in the figure, however, the dog hub 3*a*, however, when positive torque is being transmitted, is not loaded and so is free to move away from gear 2*a* if so urged by the shift mechanism.

Figure 10:
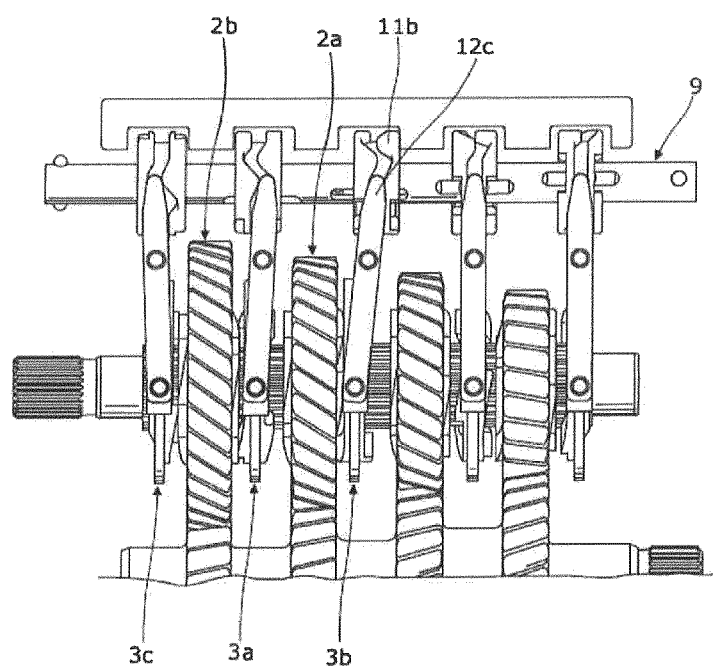
FIG. 10 is a plan view of a 4-ratio gearbox of FIG. 9 shown in the process of making an up shift from third to fourth speed.

FIG. 10 is a plan view of the gearbox of FIG. 9 including a shifting mechanism, shown in the process of making an up shift from third to fourth speed. The shift shaft 9 has been rotated fully to the fourth gear position. The dog hub 3*b* is transmitting torque from the input shaft to the gear 2*a* and so is held in engagement. The associated selector drum 11*b* is displaced along the shift shaft 9. Another dog hub 3*c* is being moved towards the gear 2*b* by action of the spring 24 in the shift shaft 9. Since the third gear 2*a* is still engaged, the gear 2*b* is rotating slower than the shaft 1*a* and the dog hubs 3, so the ramped faces of the dog features 7 ride up one another to push the dog hub 3
away from the gear 2*b* without engagement. The dog hub 3 is allowed to move away from the gear 2*b* by compressing the spring 24 inside the shift shaft 9. A further dog hub 3*a* is being moved toward the fourth gear 2*b* by action of the spring 24 inside the shift shaft 9. The dog features 7 between the fourth gear 2*b* and the dog hub 3*a* are positive driving and the main shaft is rotating faster than the fourth gear therefore as the dog hub 3 is moved axially towards the gear the leading faces of the dog features 7 contact and positive drive is achieved between the shaft and the gear 2. As drive is picked up by dog hub 3*a*, the load on dog hub 3*b* is relaxed and the gear 2*a* is then rotating faster than the main shaft 1. The ramps on the dog features 7 then will cause the dog hub 3*b* to be pushed away from the gear 2*a* and also the spring 24 in the shift shaft 9 moves the selector drum 11 back to the neutral position.

Once the dog hub 3*a* engages with gear 2*b* the main shaft rotates at the same speed as the gear 2*b* therefore dog hub 3*c* is able to move full into engagement with gear 2*b*. Fourth gear is then full engaged and the shifting process is complete.

It should be noted that the shift is achieved by the axial movement of an intermediate dog hub 3, which is between the two gears 2 which are engaged or disengaged. This dog hub 3 is free to move to initiate the shift since it is the negative driving component for the gear 2 being disengaged, and it makes the engagement because it is the positive driving component for the gear 2 which is to be engaged. Once engagement is made by the intermediate dog hub 3 the positive driving dog hub 3 from the earlier selected gear 2 is released and synchronisation is achieved to allow the negative driving dog hub 3 on the gear 2 being engaged to move fully into engagement.

Expressed more generally, if a positive driving selector member is moved toward a drive member of a higher gear, the leading edges of the projections on each are moving towards each other, because of the different gear ratio. When the leading edges contact, drive is picked up by the higher gear drive member and the selector for the lower gear drive member becomes disengaged. Because drive from the lower gear is only disengaged after the drive is picked up by the higher gear, no interruption in torque transmission occurs and the shift may be substantially instantaneous.

Down shifts are completed by the same mechanism of movement of the intermediate gear 2 while negative torque is being transmitted, in the case of a conventional engine driven vehicle this would be when the diver has lifted off the accelerator pedal.

If a down shift is required when positive driving torque is demanded for example if the vehicle is climbing a slope and vehicle speed is falling, a different shifting process is employed. While the gearbox is transmitting positive torque, a single down shift can be pre-selected by rotating the shift shaft 9 to the next lower gear position. The intermediate dog hub 3 is not free to move since it is the positive driving engagement between the gear 2 and the input shaft. The selector drum 11 for the intermediate gear 2 therefore is axially displaced along the shift shaft 9 and the spring 24 inside the shift shaft 9 is further compressed. The negative driving dog hub 3 for the lower gear to be engaged is brought into contact with the gear 2 but it is rotating slower than the gear 2 so it does not engage. To complete the shift, in this example, the driver momentarily reduces or reverses the driving torque to release the intermediate dog hub 3. This is most easily achieved by lifting the accelerator or alternatively by dipping a clutch pedal, if provided. As soon as the torque transmitted through the intermediate dog hub 3 is relaxed the compressed spring 24 in the shift shaft 9 moves the dog hub 3 into engagement with the lower gear, the negative driving dogs engage, the gear 2 and shaft 1 are synchronised and the forward driving dog falls into engagement completing the down shift.

If there exists positive driving torque which holds a dog hub 3 into engagement when more than one down shift is attempted, without allowing the shift to be completed by reducing the torque, there would be, if no steps were taken to prevent it, the possibility that a negative driving dog hub for a lower gear could be engage while the positive driving dog of the other gear is still engaged. This would result in a lock up condition which is likely to cause significant damage to the assembly, but can be addressed as set out below.

Figure 11:
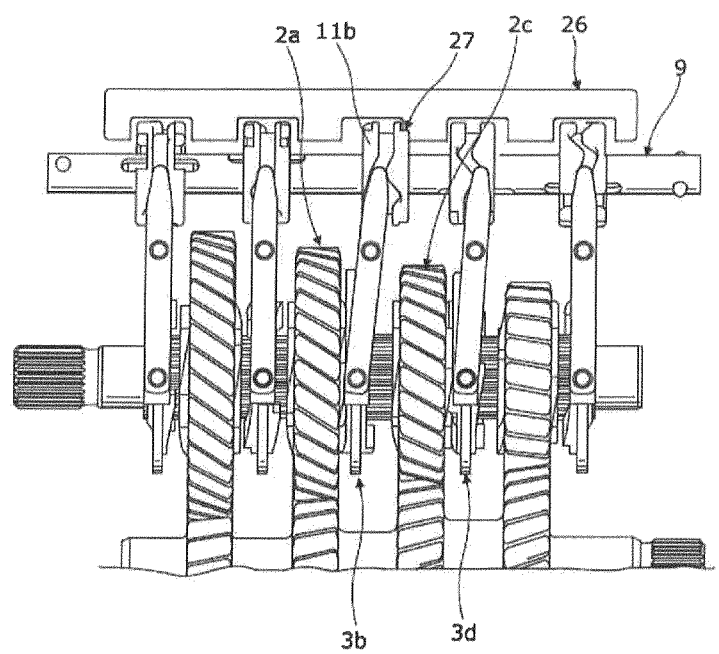
FIG. 11 is a plan view of a 4-ratio gearbox of FIG. 9 shown with a down shift pre-selected while positive driving torque is present.

FIG. 11 is a plan view of the gearbox with a down shift pre-selected while positive driving torque is present. Dog hub 3*b* is held in engagement with gear 2*a*. Dog hub 3*d* is moved towards gear 2*c* but as the gear 2*c* is rotating faster than the main shaft due to gear 2*a* being still engaged, the reverse driving dog 3*d* does not engage. In this condition the shift shaft 9 has been rotated to a position corresponding to the lower gear being fully engaged. As dog hub 3*b* is held in engagement with gear 2*a* the selector drum 11*b* is displaced along the shift shaft 9 and the cut-out 27 is engaged with the gate 26. The shift shaft 9 can therefore not be rotated further to pre select a second down shift and so a lockup condition is prevented. Similar cut outs are present in both sides of each selector drum 11 and the gate 26 is adjacent to each side of each selector drum 11, therefore pre-selection of more than one up shift while negative torque is transmitted is similarly prevented. The cut-outs 27 therefore prevent the simultaneous engagement by a negative driving dog hub 3 of one gear 2 and a positive driving dog hub 3 of a higher gear 2, and also prevent the simultaneous selection of a positive driving dog hub 3 of one gear 2 and a negative driving dog 3 of a lower gear 2.

The shift shaft 9 in this example must be rotated by a predetermined angle on each shift. For manual operation this is most easily achieved using any form of indexing mechanism familiar to one skilled in the art for example a ratchet mechanism used for indexing a selector drum in a motor cycle gearbox. Alternatively any form of rotary actuator for example an electric servo motor, a hydraulic servo motor or a pneumatic servo motor could be used.

Other shifting mechanisms which provide the necessary control of the dog hubs 3 to achieve appropriate selection of gears may be devised by one skilled in the art, for example other mechanical manually operated devices, use of individual actuators for example electrometrical actuators, hydraulic actuator or pneumatic actuator for each of the dog hubs 3. Electronic or other forms of control system may be used to operate the gear mechanism. This could simply take the form of a means to determine when to make a shift and so automating the shifts using a mechanical shift mechanism or could be a system to control the operation of the individual dog hubs 3 in the necessary sequences.

It will be apparent to one skilled in the art that the shifting components and mechanism of the described Q-shift gearbox be used in many different configurations of gearbox or transmission for any purpose, for example using any number of different selectable gears or with selectable gears mounted on more than one shaft.

It will be noted that a gear shift as performed by the presently described gearbox results in substantially an instantaneous step change in the speed of the driving engine or other rotating power source without requiring use of a clutch (thus reducing complexity of use). Since this power source will have some inertia there will be a torque pulse imparted to the connected drive line. With the drive line of a vehicle there exist various sources of torsional flexibility, for example drive shafts, clutch plate springs and tyres, which will absorb the torque pulse. In the case of a high performance vehicle, for example a sports car or racing car this torque pulse may be acceptable to the driver, however for a vehicle requiring a higher level of refinement it may be desirable to include in the drive line a further torsionally flexible component or a torque limiting component. Alternatively a conventional clutch may be used to fully or partially disengage the engine while shifts are completed.

It should be noted that the gearbox or any of the components may be used in any mechanism requiring the selective coupling of components to shafts. It should also be noted that a gearbox or any of the components described herein may be used in conjunction with any rotary power source and rotary load for example in a transmission coupling an electric motor to the wheels of a vehicle. Other examples of rotary power sources which could be used include, but are not limited to, hydraulic motors, pneumatic motors, internal combustion engines and gas turbine engines.

An embodiment of the present invention will now be described with reference to FIGS. 12-15. The improved clutchless gearbox 100 includes an input shaft 101, a main shaft 102 and a lay gear 103. The main shaft 102 and lay gear 103 extend parallel to one another. The gearbox 100 provides six gear ratios. There are five toothed gearwheels 104a-e on the main shaft 102, each meshed with a corresponding gear on the lay gear 103. A desired ratio is selected by axially displacing two of the dog hubs 105a-e into operative engagement with the relevant gearwheel 104a-e, in a manner similar to that previously described. The lay gear 103, main shaft 102, gearwheels 104a-e and dog hubs 105a-e have a similar structure to that previously described.

In one mode of operation of the previously described Q-shift gearbox, power flows from a main shaft 1a (functioning as an input shaft) to a lay gear 8 (functioning as an output shaft) and on to the wheels (see FIG. 6). However, in contrast, in some modes of operation of the gearbox 100 the input shaft 101 is not connected directly to the output shaft 102 but is instead connected thereto via the lay gear 103. Specifically the input shaft 101 is connected to the lay gear 103 through a gear mesh and the output shaft 102 (referred to hereafter as the "main shaft" 102) is meshed with the lay gear 103.

The input shaft 101 is laterally offset from the lay gear 103. The input shaft 101 extends co-axially with the main shaft 102. This is shown most clearly in FIG. 12.

The input shaft 101 comprises a shaft portion 106 and an input gear 107. The input gear 107 is provided at an end of the shaft portion 106 and is integral therewith. The input shaft 101 extends through an aperture in the casing 108 of the gearbox 100 such that the input gear 107 is located inside the casing 108 (see FIG. 12). The input shaft 101 is mounted on bearings in the aperture for axial rotation. The shaft portion 106 is elongate. The majority of the shaft portion 106 has a cylindrical form of generally constant radius. In the region of the input gear 107, there is a section of the shaft portion 106 of increased radius. This section is connected to the remainder of the shaft portion 106 by a section of increasing radius.

Figure 13:
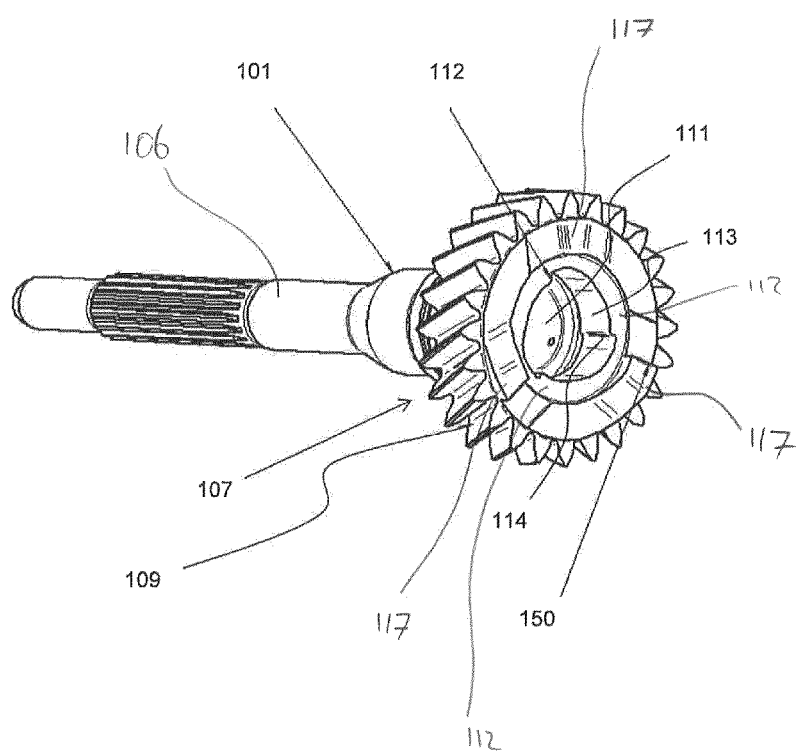
FIG. 13 is a perspective view of an input shaft of the gearbox in FIG. 12.

The input gear 107 is shown in detail in FIG. 13. The input gear 107 has a circumferential outer surface having helical gear teeth 109 for meshing to the teeth of a corresponding gear of the lay gear 103. The input gear 107 has a slightly smaller diameter than the smallest-diameter gear 104e on the main shaft 102. The generally circular face of the input gear 107, which faces the main shaft 102, is provided with a clutch recess 111. The recess 111 is a blind bore and extends generally axially. The recess 111 has first and second portions, the first portion having a larger radius than the second portion. The first portion is adjacent the circular face of the input gear 107. The inwardly-facing wall of the first portion of the recess 111 is provided with three clutch teeth 112. The teeth 112 are spaced at equal angles around the wall. Each clutch tooth 112 comprises a ramped projection extending in the axial plane of the clutch receiving recess. By "ramped projection" it is meant that one end of each tooth 112 is raised from the wall of the recess 111, while the other end of the tooth 112 is flush with the wall of the recess 111. Each tooth 112 has an upper surface 113 which is inclined to the wall of the recess 111 and connects the raised end of the tooth 112 with the non-raised end. This upper surface 113 of the tooth 112 is an operative surface and will be referred to as the ramp 113 of the tooth. At the raised end of the tooth 112 there is a generally rectangular surface 114 lying generally in a plane perpendicular to the axial plane of the recess. This generally rectangular surface 114 is an operative surface and will be referred to as the abutment surface 114. The operation of the above mentioned features will be described later.

Figure 14:
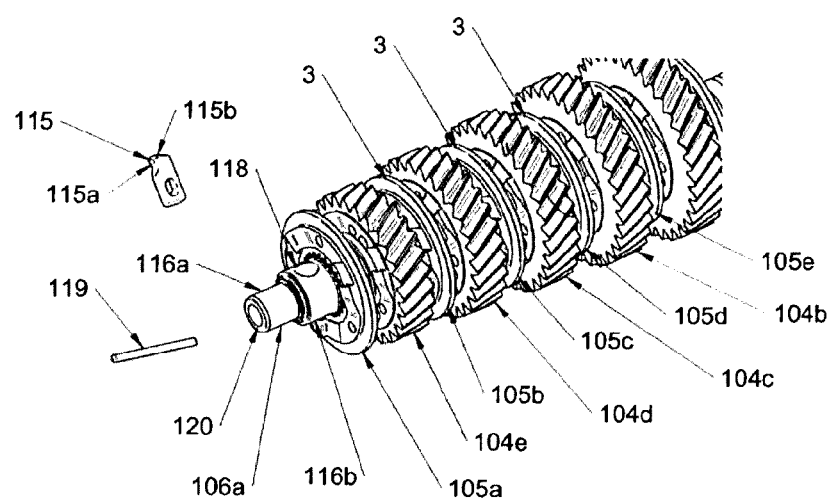
FIG. 14 is an exploded view of a one way clutch of the gearbox in FIG. 12.
Figure 15:
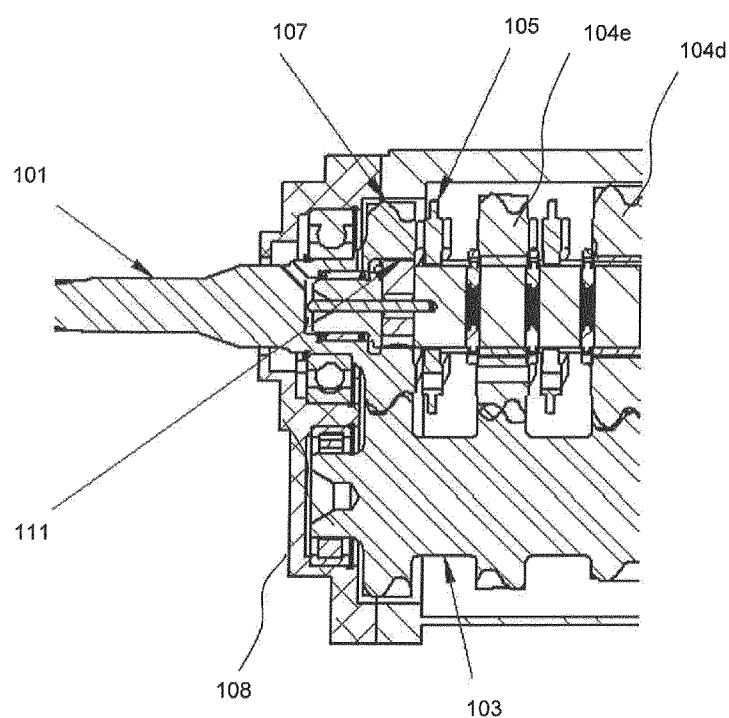
FIG. 15 is an expanded cross-sectional view of the input shaft and one way clutch of the gearbox in FIG. 12.

As can be seen in FIG. 14, the dog hub 105a is provided between the gear 104e on the main shaft 102 corresponding to fifth gear and the input gear 107. That dog hub 105a is provided with dog features (already described e.g. in connection with FIG. 3 at least) on both faces. Corresponding dog features are provided on the front face 150 of the input gear 107 and are denoted 117 in FIG. 13. The presence of the clutch recess 111 in the front face of the input gear 107 defines an annular surface upon which the dog features 117 are located. There are three such corresponding dog features 117, spaced at equal angles around the annular surface and having the same structure and form as those dog features on the gears 104a-e of the main shaft 102.

A movable finger 115 (or pawl), which rotates with the main shaft 102 provides a one-way clutch action by interacting with teeth 112 on the inner surface of the clutch recess 111. The finger 115 is mounted in an end portion of the main shaft 102. The end portion is located within the clutch recess 111 (see FIG. 15). The end portion is generally cylindrical in form and has distal 116a and proximal 116b sections relative to the main shaft 102 (see FIG. 14). The distal section 116a has a smaller diameter than the proximal section 116b (see FIG. 14). The finger 115 is located within a finger-retaining bore 118 in an end portion of the main shaft 102. The finger-retaining bore 118 is a radially-extending through bore of generally circular cross-section. The finger 115 can move along the finger-retaining bore 118 under the influence of the centripetal acceleration that is generated by the rotation of the main shaft 102.

The finger 115 has the form of a generally rectangular plate. At the radially outer end of the finger 115, a portion of the corner is cut out to define an abutment toe 115a. The other corner of the radially outer end is chamfered in the axial plane to provide a shoulder 115b. The finger 115 can move radially outwardly and inwardly. The centripetal acceleration caused by the rotation (or, alternatively, a spring) urges the finger 115 radially outwardly.

Rotation of the finger 115 in the finger-retaining bore 118 is constrained by the presence of a retaining pin 119 that passes through an oval shaped aperture in a lower portion of the finger 115. Radial movement of the finger 115 within the finger-retaining bore 118 is also constrained by the pin 119. The pin 119 is retained in a pin-retaining bore 120 in the main shaft 102. The pin-retaining bore 120 is a blind bore of circular cross-section that extends axially from the free end of the main shaft 102 and intersects the finger-retaining bore 118.

In alternative embodiments the finger-retaining bore 118 is a blind hole of rectangular cross-section and used with a finger 115 of rectangular cross-section such that rotation of the finger 115 in the finger-retaining bore 118 is constrained by the co-operating shapes of the finger 115 and finger-retaining bore 118.

Figure 12:
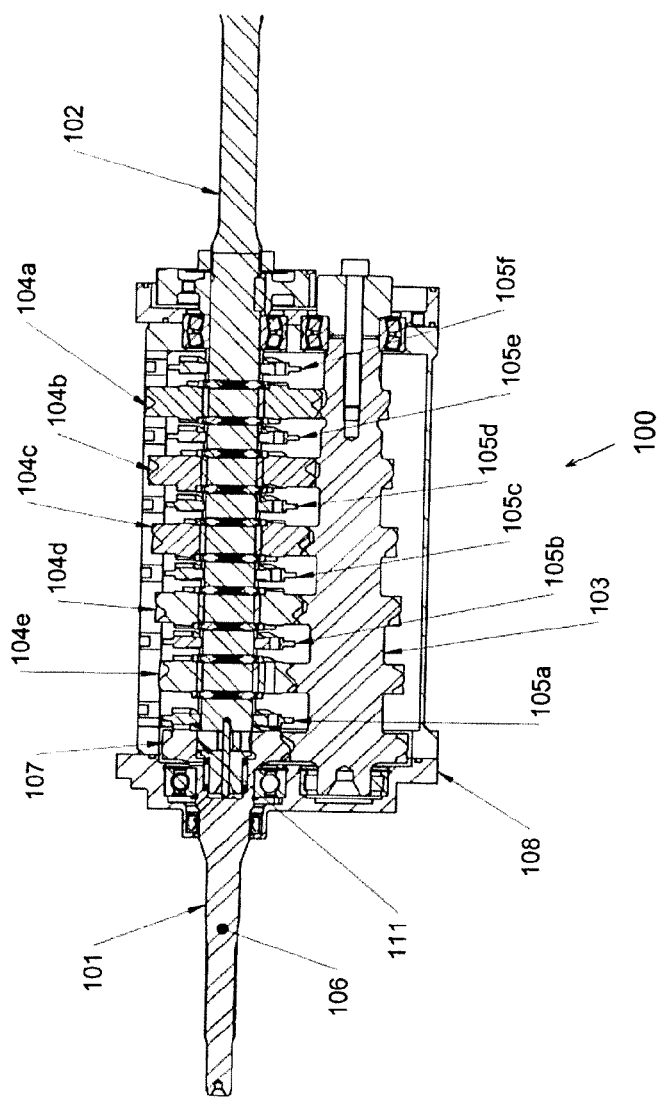
FIG. 12 is a cross-sectional view through a gearbox according to an embodiment of the present invention.

When the gearbox 100 in FIG. 12 is in a positive torque condition, torque can be transferred from the input shaft 101 to the main shaft 102 by engagement of the dog features of the selected gearwheel 104a-e on the main shaft 102 with the dog features of the dog hub 105a-e to the right of the selected gearwheel 104a-e. The torque may change direction, such that the main shaft 102 applies a torque to the input shaft 101. This will be referred to as a negative torque condition and may occur when the driver releases the accelerator pedal. In such a situation, the main shaft 102 (and so the dog hubs 105a-e) will rotate faster than the selected gearwheel (the selected gearwheel being whichever of the gearwheels 104a-e is rotationally fixed to the main shaft 102 at a particular time). This causes the dog features in the right face of the gearwheel 104a-e, from the perspective shown in FIGS. 12 and 15, to separate from the dog features on the dog hub 105a-e on the right of the selected gearwheel 104a-e. Furthermore, the dog features on the dog hub 105a-e on the left of the selected gearwheel 105a-e will catch up with the dog features on the left face of that gearwheel 105a-e and engage them. It is through this engagement that torque is transferred from the main shaft 102 to the lay gear 103 and then to the input shaft 101.

Another mode of operation of the gearbox 100, specifically the change from fifth to sixth gear, will now be described. If sixth gear is desired, the gear change mechanism is used to axially displace the dog hub 105a located on the left (as shown in FIG. 14) of the gearwheel 104e corresponding to fifth gear into engagement with the input gear 107. By virtue of its smaller diameter, the input gear 107 is rotating faster than the fifth gearwheel 104e. Therefore the dog features 117 on the annular face 150 of the input gear 107 catch up with and engage the dog features on the left hand side of the dog hub 105a. The input gear 107 urges the dog hub 105a to rotate faster, ie there is a positive torque condition such that the ratio between the rotational speeds of the input shaft 101 and the main shaft 102 becomes 1:1.

Negative torque, ie torque applied from the main shaft 102 to the input gear 107 when in sixth gear, is transferred through the one-way clutch. The centripetal acceleration generated by rotation of the main shaft 102 causes the finger 115 of the clutch to travel radially outwards along the finger-retaining bore 118. While a positive torque condition exists, the outer end of the finger 115 abuts the inner wall of the clutch cavity 111. At this point no torque is transferred from the finger 115 to the teeth 112 of the recess. When the torque changes direction, ie when a negative torque condition is entered, the main shaft 102 (and hence the finger 115) will rotate faster than the input shaft 101. This causes (a) the contacting dog features of the input gear 107 and the dog hub 105a to separate; and (b) the toe 115a of the finger 115 to be brought into contact with the abutment portion 114 of one of the teeth 112 on the inner surface of the clutch cavity 111. Thus torque is applied to one of the teeth 112 by the finger 115. In this way torque can be transferred in sixth gear in both the positive direction (ie from the input shaft 101 to the main shaft 102) and also the negative direction (ie from the main shaft 102 to the input shaft 101).

Please note that after the dog hub 105a has been engaged with the input gear 107, the gearwheel 104e corresponding to fifth gear will be rotating more slowly than the dog hub 105b to its right with which it is engaged. This causes the ramped portions of the respective dog features on the fifth gearwheel 104e and the dog hub 105b to ride up one another, causing the dog hub 105b to be axially displaced away from the fifth gearwheel 104e.

When a downshift from sixth gear to fifth gear is desired, the driver releases the accelerator pedal. This brings the gearbox 100 into a negative torque condition, ie torque is transferred from the clutch finger 115 to one of the teeth 112 on the recess wall 111. The gear shift mechanism is then used to displace the dog hub 105a axially into engagement with the fifth gearwheel 104e. As the dog hub 105a is rotating faster than the fifth gearwheel 104e, the dog features on the dog hub 105a catch up with and engage with the corresponding dog features on the fifth gearwheel 104e. This causes the fifth gearwheel 104e to rotate faster, which, in turn, causes the input gear 107 to rotate faster. This causes the tooth 112 on the wall of the clutch recess 111 to separate from the clutch finger 115, disengaging sixth gear. The shift mechanism is used to displace the dog hub 105b on the right hand side of the fifth gearwheel 104e into engagement with the fifth gear wheel 104e. This provides a positive torque connection between the fifth gearwheel 104e and the main shaft 102, should a positive torque condition arise.

Please note that when any of the first to the fifth gear ratios are engaged, the input shaft 101 will be rotating faster than the main shaft 102. This is because the gearwheels 104a-e on the main shaft 102 all have a larger diameter than the input gearwheel 107. As a consequence, when any of the first to fifth gear ratios or reverse gear are engaged, the shoulder 115b of the clutch finger 115 slides along the inner surface of the clutch cavity 111. Specifically, the shoulder 115b will slide along the ramps 113 of the teeth 112 on the inner surface, (causing the finger 115 to move radially inwardly) and so will not transfer torque to the inner surface of the recess 111. Therefore, the clutch 115 does not transfer torque to the input gear 107 when any of gears one to five or reverse are selected.

The dog hubs 105a-f in FIG. 12 are moved along the main shaft 102 in use by a shift mechanism of the kind heretofore described in connection with the previous Q-shift gearbox.

Finally, with reference to FIG. 6, an internal combustion engine or electric motor can cause a torque to be exerted on the main shaft 1a (functioning as a gearbox input shaft), which is transferred to a lay gear 8 (functioning as a gearbox output shaft) when the gear box is in a positive torque condition. However, it is hereby stated that the gearbox could be provided the other way around such that an internal combustion engine or electric motor causes a torque to be exerted on the lay gear 8 (functioning in this case as the gearbox input shaft) which is then transferred to the main shaft 1a (functioning in this case as the gearbox output shaft) when the gear box is in a positive torque condition. The same also applies to the gearbox arrangement depicted in FIG. 12, in which instead of an internal combustion engine or electric motor causing the input shaft 101 to rotate, for causing a subsequent rotation of the main shaft 102; instead an internal combustion engine or electric motor could cause the main shaft 102 to rotate, for causing a subsequent rotation of the input shaft 101.

The invention claimed is:

1. A gearbox comprising:
   first and second rotational members, the first rotational member having a shaft portion extending away from the gearbox, the first rotational member carrying one or more projections, the second rotational member carrying one or more complementary projections, the projections carried by the first rotational member being configured to be drivingly engaged with the complementary projections carried by the second rotational member to transmit torque in a first torque connection but not in a torque connection that is opposed to the first torque connection; and a one way clutch adapted such that the first and second rotational members can be drivingly engaged to transmit torque in a second torque connection, wherein the second torque connection is opposed to the first torque connection.

2. The gearbox according to claim 1, wherein the first rotational member extends co-axially with the second rotational member.

3. The gearbox according to claim 1, wherein the first rotational member includes an input gear for transmitting torque to the second rotational member, which is done via a lay gear when the first and second rotational members are not in contact with each other.

4. The gearbox according to claim 1, wherein the engagement of the projections and the complementary projections in the first torque connection is able to transfer torque in a single rotational sense only.

5. The gearbox according to claim 1, wherein the complementary projections carried by the second rotational member are axially displaceable relative to the projections carried by the first rotational member, into engagement therewith.

6. The gearbox according to claim 1, wherein the projections and the complementary projections have a ramp-like form.

7. The gearbox according to claim 1, wherein the one way clutch comprises a first abutment surface for transmitting torque between the first rotational member and the second rotational member.

8. The gearbox according to claim 7, wherein the first abutment surface is provided on an interior surface of a clutch recess in the first rotational member.

9. The gearbox according to claim 8, wherein the clutch recess extends axially.

10. The gearbox according to claim 1, wherein the one way clutch further comprises a second abutment surface for the transfer of torque between the second rotational member and the first rotational member.

11. The gearbox according to claim 10, wherein the second abutment surface is displaceable under an influence of a centrifugal force generated by the rotation of the second rotational member, from a stowed position to an operational position, the operational position being located radially outwardly of the stowed position.

12. The gearbox according to claim 1, wherein the shaft portion of the first rotational member comprises an input shaft.

13. The gearbox according to claim 12, wherein the second rotational member comprises an output shaft.

14. The gearbox according to claim 13, wherein at least one drive member is provided on the output shaft and wherein a first selector member and a second selector member are associated with the at least one drive member, the at least one drive member comprising a first and second face, and further including, on each face, at least one further projection, and the first and second selector members comprising, on at least one face thereof, at least one further complementary projection arranged to selectively engage with the at least one further projection on each face of the at least one drive member, such that the further complementary projection(s) of the first selector member and the further projection(s) of the first face of the at least one drive member may be drivingly engaged so as to transfer torque in a first rotational sense and the further complementary projection(s) of the second selector member and the further projection(s) of the second face of the at least one drive member may be drivingly engaged so as to transfer torque in a second rotational sense, opposite to the first rotational sense.

* * * * *